United States Patent Office 3,488,371
Patented Jan. 6, 1970

3,488,371
LINEAR DIFUNCTIONAL SILYLAMIDE AND PROCESS THEREFOR
Johann F. Klebe, Schenectady, N.Y., assignor to General Electric Company, a corporation of New York
No Drawing. Filed Aug. 18, 1967, Ser. No. 661,536
Int. Cl. C07f *7/10;* C08g *51/02, 31/09*
U.S. Cl. 260—448.2      5 Claims

ABSTRACT OF THE DISCLOSURE

Linear difunctional silylamides are produced by the reaction of dihalosilicon compounds with an organic amide in the presence of specific tertiary amines. These linear difunctional silylamides are new compositions of matter and find use in the preparation of linear polysiloxanes, oils and elastomers, which oils and elastomers have a wide number of utilities as is known in the art.

---

There has been discovered a process for the production of linear difunctional silylamides of the formula (I) 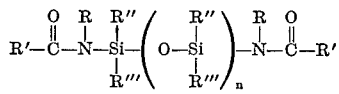

wherein R is alkyl or aryl when $n$ is 0 or 1 and is in addition hydrogen when $n$ is greater than 1 and R′, R″ and R‴ are hydrogen, alkyl groups or aryl groups, and in addition R″ and R‴ are halogenated hydrocarbon groups and cyanoalkyl groups, and $n$ is an integer of 0 to 1000 or more, which comprises reacting a halosilicon compound of the formula (II) 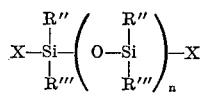

wherein R″, R‴ and $n$ have the above-identified meanings and X is halogen, e.g., fluorine, bromine, chlorine and iodine, with an organic amide of the formula (III) 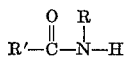

wherein R and R′ have the above-defined meanings, in the presence of specific tertiary amines.

In conducting the process of this invention, it is preferred to employ at least 2 moles of the organic amide of Formula III for each mole of the halosilicon compound of Formula II. Smaller amounts of the organic amide can, of course, be employed; however, this leads to less than complete reaction of the halogen of the halosilicon compound with the hydrogen of the amide group and leads to difficulty separable reaction mixtures.

The amount of the tertiary amine employed in the process of this invention can vary over wide ranges. It is preferred, however, to employ at least 1 mole of the tertiary amine for each mole of the amide employed for completeness of reaction and ease in isolation of the final reaction product. Lesser amounts can be employed. However, this leads to there being free hydrogen halide present in the reaction system which leads to by-products. It is therefore preferred to employ at least two moles of the tertiary amine, for each mole of the halosilicon compound employed in the process of this invention.

The temperature at which the process of this reaction is conducted can vary over wide ranges. The temperatures as low as 0° C. or lower to as high as 150° C. or higher can be employed. It is preferred, however, for ease of reaction and convenience to operate the process of this invention in the range of from 20° C. to 100° C.

The process of this invention can be operated at subatmospheric, atmospheric, or super-atmospheric pressures. It is preferred, however, for ease of reaction and convenience, to conduct the process of this invention at atmospheric pressure.

The process of the present invention is preferably conducted under anhydrous conditions. Small amounts of water can be tolerated, however, water causes the hydrolysis of the amidosilicon compound with a resultant loss in yield of the product.

Although a solvent is not necessary in conducting the process of the present invention, for ease of operation and simplicity, it is preferred to employ a solvent. Among the solvents which can be employed in the present process are those solvents which do not contain an active hydrogen or other group which is reactive with the halosilicon compound. Such solvents include, for example, benzene, toluene, xylene, chloroform, carbon tetrachloride, dioxane, tetrahydrofuran, diethyl ether, the dimethyl ether of ethylene glycol, the diethyl ether of diethylene glycol, etc.

The organosilylamides produced in accordance with the process of this invention of the formula (IV) 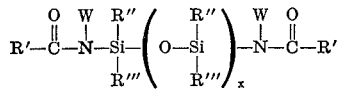

wherein R′, R″, and R‴ are as above-identified and W is an alkyl or aryl group and $x$ is an integer of 0 or 1, are produced by reacting the halosilicon compounds of Formula II wherein $n$ is 0 or 1 with the organic amides of Formula III wherein R is an alkyl or aryl group. If R is hydrogen, linear silylamides are either not produced or only in small yields as minor by-products in the reaction mixtures. These silylamides are, for example, bis(N-methylacetamido)methylphenylsilane, bis(N - methylacetamido)dimethylsilane, bis(N-methylacetamido)diphenylsilane, bis(N - β-phenylisopropylacetamido)methylphenylsilane, bis(N - ethylacetamido)tetraphenyldisiloxane, bis (N - propylpropamido)tetramethyldisiloxane, bis(N - β - phenylisopropylpropamido)methylphenyldisiloxane, etc.

Organoamidosiloxanes of the formula (V) 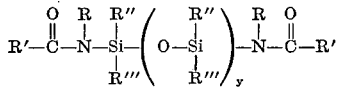

wherein R, R′, R″, and R‴ have the above-defined meanings and $y$ is an integer of from 2 to 1000 or more, are produced by the reaction of the halosilane of Formula II wherein $n$ is an integer greater than 1 with an organoamide of Formula III wherein R is hydrogen or alkyl or aryl. Illustrative of these α-ω-organoamidopolysiloxanes are, for example, α-ω-bis(N-methylacetamido)hexamethyltrisiloxane, α - ω - bis(N-ethypropamido)triphenyltrimethylsiloxane, α - ω - bis(N-methylacetamido)trimethyltricyanopropyltrisiloxane, etc.

Illustrative of the haloorganosilicon starting materials of Formula II which can be employed in the process of this instant invention are included the dihalosilanes such as dichlorosilane, methylhydrogendichlorosilane, dimethyldichlorosilane, methylphenyldichlorosilane, γ - cyanopropylmethyldichlorosilane, diphenyldibromosilane, ethylmethyldibromosilane, methylisopropyldiiodosilane, β-cyanoethylmethyldichlorosilane, etc. Illustrative of the dihalosiloxanes of Formula II which can be employed in the process of this invention are α-ω-dichlorotetramethyldisiloxane, α-ω-dibromohexaphenyltrisiloxane, α-ω-dichlorodimethylsiloxane - phenylmethylsiloxane copolymer, α-ω-dichlorocyanopropylmethylpolysiloxane, α - ω - dibromophenylmethylpolysiloxanes, etc.

Illustrative of the monovalent hydrocarbon, halogenated monovalent hydrocarbon and cyanoalkyl groups are presented by R″ and R‴ in the alkyl groups including cycloalkyl groups containing from 1 to 18 or more carbon atoms, e.g., methyl, ethyl, isopropyl, tert-butyl, octyl, cyclohexyl, octadecyl, etc.; alkenyl groups containing from 2 to 18 or more carbon atoms, e.g., vinyl, allyl, cyclohexenyl, cycloheptenyl, undecylenyl, octadecenyl, etc.; aryl radicals containing from 6 to 22 or more carbon atoms, e.g., phenyl, naphthyl, anthracenyl, etc.; alkaryl radicals containing from 7 to 23 or more carbon atoms, e.g., tolyl, xylyl, mesityl, methylnaphthyl, ethylphenyl, isopropylphenyl, etc.; aralkyl radicals containing from 7 to 23 or more carbon atoms, e.g., phenylmethyl, phenylethyl, phenylpropyl, etc.; halogenated monovalent hydrocarbon radicals such as chloromethyl, dibromophenyl, trifluoromethylpropyl, trifluoromethylphenyl, chloropropyl, etc.; and cyanoalkyl radicals, e.g., cyanomethyl, β-cyanoethyl, α-cyanoethyl, γ-cyanopropyl, tetracyanobutyl, etc.

Illustrative of the alkyl and aryl groups which R and R′ represent are those given above for R′ and R‴.

Illustrative of the tertiary amine which are employed in the process of this invention are those having a dissociation constant in order of at least $1 \times 10^{-6}$, for example, triethylamine, trimethylamine, phenyldimethylamine, tributylamine, tripropylamine, triphenylamine, N-methylpyrrolidine, methyldiethylamine, benzylpyrrolidine, dimethylethylamine, etc.

The amidosilyl compounds of this invention can be hydrolyzed with water in a solvent such as diethyl ether to yield rubbery siloxanes in accordance with the following equation

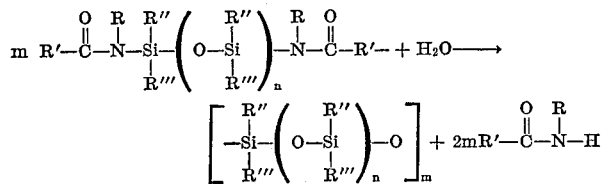

where m is the number of moles of the organosilyl compound employed and R, R′, R″ and R‴ and n have the above-defined meanings. These rubbery siloxanes can be compounded with fillers such as finely divided silica and a curing agent such as dibenzoyl peroxide, and heat cured to yield organopolysilozane elastomers which are useful as gasketing materials, shock absorbers, wire insulation, etc.

The following examples serve to further illustrate the invention. All parts are by weight unless otherwise expressly set forth.

EXAMPLE 1

N-methylacetamide (146 g., 2 moles), triethylamine (800 g.) and diethyl ether (500 cc.) were placed in a reaction flask. To this mixture was added slowly methylphenyldichlorosilane (192 g.). An exothermic reaction occurred and triethylamine hydrochloride precipitated. Stirring was continued for two hours at room temperature after the addition was complete. The mixture was then allowed to stand overnight, was filtered and the solvent removed to yield a white, solid product which was redissolved in 500 cc. of dry diethyl ether. Approximately ½ of the diethyl ether was evaporated and the remainder was placed in the refrigerator to allow the bis(N-methylacetamido)methylphenylsilane to crystallize, 240 g. were obtained having a melting point of 66° to 68° C. The bis(N-methylacetamido)methylphenylsilane was analyzed with the following results:

Found: C, 59.5%; H, 7.8%; N, 10.7%; Si, 10.7%. Calculated: C, 59.1%; H, 7.6%; N, 10.6%; Si, 10.6%.

EXAMPLE 2

N-methylacetamide (80 g.), benzene (300 g.) and pyridine (100 g.) were added to a reaction flask. To this mixture was added dimethyldichlorosilane (65 g.) with stirring. No reaction took place. Triethylamine (120 g.) was added slowly and an exothermic reaction took place, precipitating triethylamine hydrochloride. The mixture was heated at reflux for 1 hour and allowed to cool and filtered. The filtrate was fractionated to give bis(N-methylacetamido)dimethylsilane boiling at 65°–75° C. at 0.5 mm. of mercury. The bis(N-methylacetamido)dimethylsilane had the following analysis:

Found: C, 47.8%; H, 8.7%; N, 13.9%; Si, 14.2%. Calculated: C, 47.5%; H, 8.9%; N, 13.8%; Si, 13.9%.

EXAMPLE 3

An α-ω-dichlorosubstituted dimethylpolysiloxane (150 g.) having the formula

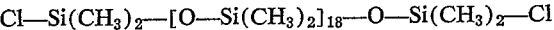

was added with stirring to a mixture of N-methylacetamide (20 g.), triethylamine (30 g.), and dry benzene (500 g.). There resulted a slightly exothermic reaction and triethylamine hydrochloride precipitated. The mixture was stirred at room temperature for 15 hours. The mixture was then filtered and the filtrate freed of solvent and excess N-methylacetamide by heating in a vacuum to a temperature of 130° C. at 0.1 mm. of mercury. A liquid remained which was identified as a polysiloxane of the formula

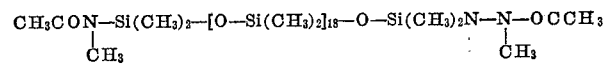

having the following analysis:

Found: C, 34.3%; H, 7.9%; N, 1.8%; Si, 35.3%. Calculated: C, 34.3%; H, 8.3%; N, 1.7%; Si, 34.9%.

EXAMPLE 4

Diphenyldichlorosilane (24.5 g.) was added dropwise to a stirred mixture of N-methylacetamide (15 g.), triethylamine (25 g.) and benzene (100 cc.) in a reactor which was blanketed with dry nitrogen. An exothermic reaction took place and triethylamine hydrochloride precipitated. The stirring was continued for 2 hours at room temperature after the addition was complete. The precipitate was then removed by filtration and the filtrate concentrated in vacuo. White crystals precipitated from the solution. The white crystals were recrystallized from a 1:1 mixture of hexane and benzene and gave a melting point of 78° to 80° C. The proton magnetic resonance spectrum showed single sharp peaks at 2.1 p.p.m. and 2.82 p.p.m. corresponding to the acetyl methyl protons and N-methyl protons, respectively, and aromatic signals at 7.2 to 7.7 p.p.m. The signal ratio was 6:6:10 as required for the bis(N-methylacetamido)diphenylsilane. Deuteriochloroform was used as the solvent. Analysis gave the following results:

Found: C, 66.5%; H, 6.6%; N, 8.4%. Calculated: C, 66.2%; H, 6.8%; N, 8.6%.

EXAMPLE 5

Methylphenyldichlorosilane (20 g.) was slowly added to a suspension of 37 g. of acetylamphetamine in 150 cc. of triethylamine. Anhydrous conditions were maintained throughout the reaction. A precipitate of triethylamine hydrochloride was formed. The reaction was completed by heating to reflux for 2 hours. The reaction mixture was filtered to remove the triethylamine hydrochloride and the excess triethylamine was removed by vacuum distillation. The material was vacuum distilled to yield bis(N-β-phenylisopropylacetamido)methylphenyl silane as a colorless liquid having a boiling point of 170° to 175° C. at 30μ.

It will, of course, be apparent to those skilled in the art that modifications other than those set forth in the above examples can be employed in the process of this invention.

What I claim as new and desire to secure by Letters Patent of the United States is:

1. A composition which has the formula

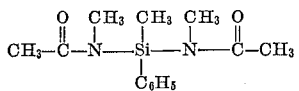

2. A composition which has the formula

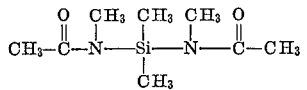

3. A composition which has the formula

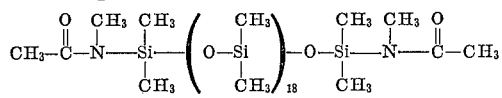

4. A composition which has the formula

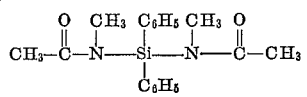

5. A composition which has the formula

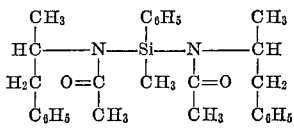

References Cited

UNITED STATES PATENTS 2,876,209  3/1959  de Benneville et al. 260—448.2 XR
2,876,234  3/1959  Hurwitz et al. __ 260—448.2 XR DELBERT E. GANTZ, Primary Examiner P. F. SHAVER, Assistant Examiner U.S. Cl. X.R.
260—37, 46.5